(12) United States Patent
Luo et al.

(10) Patent No.: US 11,875,524 B2
(45) Date of Patent: Jan. 16, 2024

(54) UNMANNED AERIAL VEHICLE PLATFORM BASED VISION MEASUREMENT METHOD FOR STATIC RIGID OBJECT

(71) Applicant: BEIHANG UNIVERSITY, Beijing (CN)

(72) Inventors: Xiaoyan Luo, Beijing (CN); Bo Liu, Beijing (CN); Xiaofeng Shi, Beijing (CN); Chengxi Wu, Beijing (CN); Lu Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 235 days.

(21) Appl. No.: 17/527,267

(22) Filed: Nov. 16, 2021

(65) Prior Publication Data
US 2022/0198695 A1    Jun. 23, 2022

(30) Foreign Application Priority Data
Dec. 17, 2020 (CN) .......................... 202011496577.8

(51) Int. Cl.
| | |
|---|---|
| *G06T 7/60* | (2017.01) |
| *G06T 7/80* | (2017.01) |
| *G06T 7/11* | (2017.01) |
| *G01B 11/00* | (2006.01) |
| *G01B 11/24* | (2006.01) |
| *G06T 5/00* | (2006.01) |
| *G06T 17/10* | (2006.01) |

(52) U.S. Cl.
CPC .............. *G06T 7/60* (2013.01); *G01B 11/002* (2013.01); *G01B 11/24* (2013.01); *G06T 5/002* (2013.01); *G06T 7/11* (2017.01); *G06T 7/80* (2017.01); *G06T 17/10* (2013.01); *G06T 2207/10028* (2013.01); *G06T 2207/10032* (2013.01)

(58) Field of Classification Search
None
See application file for complete search history.

(56) References Cited

PUBLICATIONS

Hu et al., Stable least-squares matching for oblique images using bound constrained optimization and a robust loss function, May 4, 2016, Elsevier, ISPRS Journal of Photogrammetry and Remote Sensing 118, 53-67 (Year: 2016).*

* cited by examiner

*Primary Examiner* — Robert J Craddock
(74) *Attorney, Agent, or Firm* — ArentFox Schiff LLP; Michael Fainberg

(57) ABSTRACT

The present disclosure provides an unmanned aerial vehicle platform based vision measurement method for a static rigid object. Aiming at the problem of high professionality but poor versatility of existing vision measurement methods, the present disclosure uses a method combining object detection and three-dimensional reconstruction to mark an object to be measured, and uses a three-dimensional point cloud processing method to further mark a size to be measured and calculate its length, which takes full advantage of the convenience of data collection by an unmanned aerial vehicle platform (UAV), and its global navigation satellite system (GNSS), an inertial measurement unit (IMU) and the like to assist measurement. There is no need to use common auxiliary devices such as a light pen and a marker, which can improve the versatility of vision measurement.

3 Claims, 1 Drawing Sheet

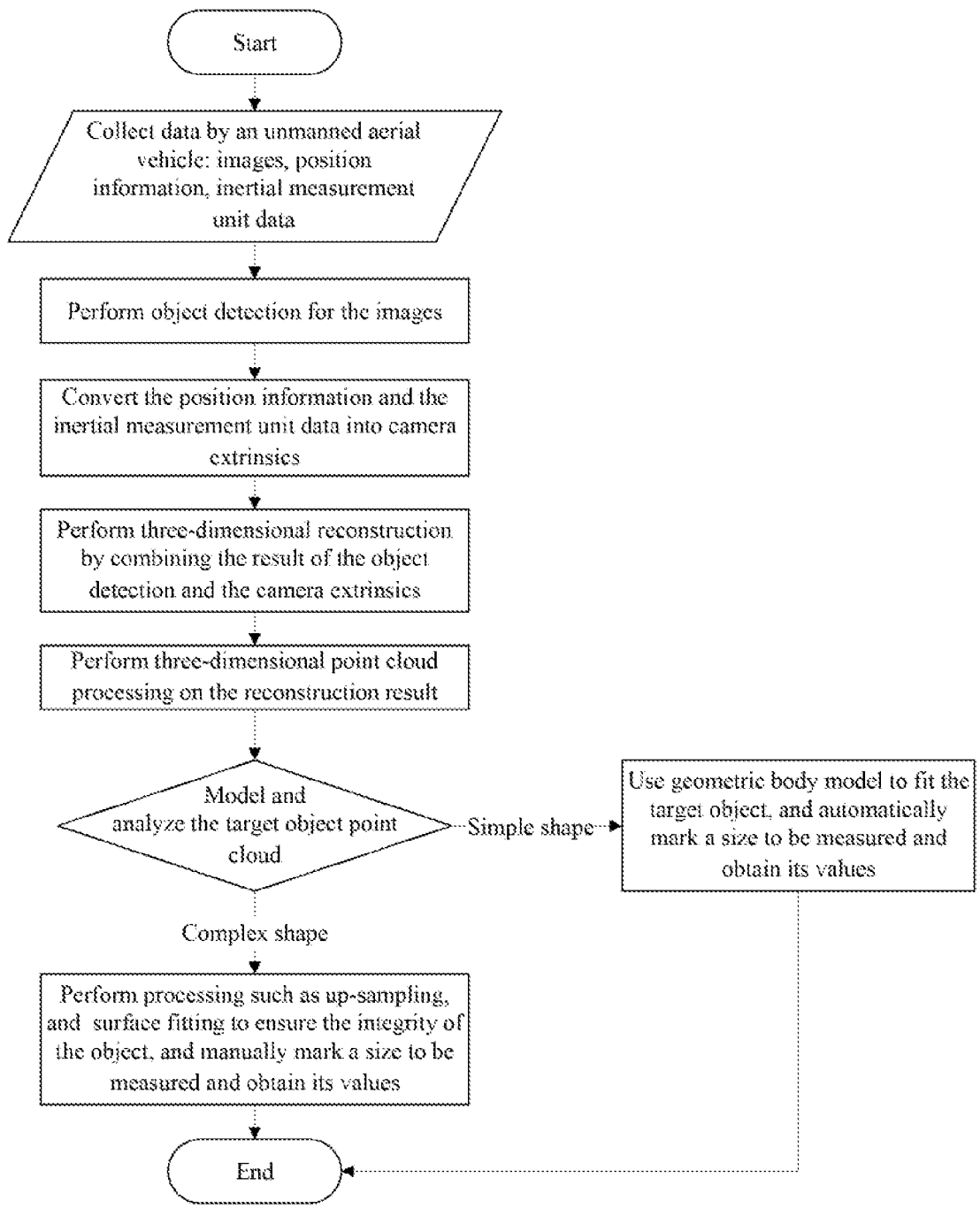

UNMANNED AERIAL VEHICLE PLATFORM BASED VISION MEASUREMENT METHOD FOR STATIC RIGID OBJECT

CROSS REFERENCE TO RELATED APPLICATION(S)

This patent application claims the benefit and priority of Chinese Patent Application No. 202011496577.8, filed on Dec. 17, 2020, the disclosure of which is incorporated by reference herein in its entirety as part of the present application.

TECHNICAL FIELD

The present disclosure relates to the field of machine vision, and more specifically relates to a vision measurement method for a static rigid object.

BACKGROUND ART

Vision measurement is a technique for measuring a size and a pose of an object by shooting a target. This technique is simple to operate, and can realize measurement without touching the object, thus being less restricted by scenes and targets.

According to the modes of image shoot, vision measurement is mainly divided into three types: monocular vision measurement, binocular vision measurement, and structured light vision measurement. The monocular vision measurement requires auxiliary devices such as a laser ranging sensor, a light pen, and a marker to obtain three-dimensional scale information, and mark a size to be measured for measurement. The binocular vision measurement uses two cameras, which can directly obtain three-dimensional scale information, but still need a marker or a light pen to assist measurement. The structured light vision measurement obtains a precise and complex geometric shape of an object by emitting coded structured light and receives light reflected by the surface of the object, which has a great difference from the other two vision measurement solutions and the solution of the present disclosure.

At present, the vision measurement basically adopts the above-mentioned solutions, which are highly professional and costly, and mostly used for precision industrial measurement, and have relatively less application fields.

SUMMARY

Most of the existing vision measurement solutions intend to accurately measure sizes of parts industrially, and thus often require auxiliary devices such as a light pen, and a marker, which results in high professionality but poor versatility. In view of the technical problems above, the present disclosure provides a solution of static rigid object vision measurement based on an unmanned aerial vehicle platform to improve the versatility of vision measurement. The existing vision measurement solutions mainly measure the size by calculating parameters such as a distance between marked points in the three-dimensional space. An image is captured by a camera at fixed position, three-dimensional scale information is obtained by using a light pen, multiple cameras, and the like, and the marked points are obtained by manual marking using a marker, a light pen tip and the like. According to the solution of the present disclosure, a method combining object detection and three-dimensional reconstruction is used to mark an object to be measured, and a three-dimensional point cloud processing method is used to further mark a size to be measured and calculate its length to complete the measurement. An image is captured by using a camera carried by an unmanned aerial vehicle (UAV), three-dimensional scale information is obtained using a global navigation satellite system, an inertial measurement unit (IMU), and the like of the UAV, and the size to be measured is marked by a computer. Compared with the existing solutions, the solution of the present disclosure is more convenient in obtaining images, has no need of auxiliary devices such as a marker and a light pen, and only needs the UAV to collect data for measurement, and remaining operations are completed on the computer, such that the versatility of vision measurement is improved.

The present disclosure provides the following technical solution:

Provided is an unmanned aerial vehicle platform based vision measurement method for a static rigid object includes the following steps:

step 1: collecting data by using a UAV, specifically including an image set, UAV position information corresponding to each image, and IMU data corresponding to each image, where the image is obtained by a camera carried by the UAV, the position information is obtained by the GNSS of the UAV, and the IMU data is obtained by an IMU on the UAV;

step 2: performing object detection on all images and determining coordinates of a target object in each image;

step 3: converting the UAV position information and the IMU data corresponding to each image into camera extrinsics:

$$R = \begin{bmatrix} \cos\gamma & \sin\gamma & 0 \\ -\sin\gamma & \cos\gamma & 0 \\ 0 & 0 & 1 \end{bmatrix} \begin{bmatrix} 1 & 0 & 0 \\ 0 & \cos\beta & \sin\beta \\ 0 & -\sin\beta & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix}$$

$$t = P_1 - P_2$$

where $\alpha$, $\beta$, and $\gamma$ are rotation transformation Euler angles between a UAV body coordinate system (an IMU coordinate system) corresponding to a current image and a local horizontal coordinate system (a North-East-Down (NED) coordinate system), which are measured by the IMU; $P_1$ is initial position coordinates of the UAV in the NED coordinate system, which is provided by the GNSS; $P_2$ is UAV position coordinates corresponding to a current image in the NED coordinate system, which can be provided directly by the GNSS or can also be calculated from the IMU data in combination with $P_1$, and combining $P_2$ obtained by two different channels can improve the accuracy of the result; t calculated by $P_1 - P_2$ is a translation corresponding to the current image of the UAV; and with R used as a rotation matrix of the camera, and t used as a translation vector of the camera, the camera extrinsics can be obtained;

step 4: performing three-dimensional reconstruction by combining the result of the object detection and the calculated camera extrinsics:

4.1. extracting features of each image successively, and removing parts not belonging to the target object;

4.2. screening the images to remove images with feature numbers less than a threshold $T_1$, and generating feature descriptors for the remaining images;

4.3. performing feature matching between the images, and removing image pairs with matching numbers less than a threshold $T_2$;

4.4. performing three-dimensional reconstruction with the remaining image pairs to obtain a three-dimensional point cloud, where in the reconstruction process, the camera extrinsics calculated in the step 3 are used.

step 5: performing three-dimensional point cloud processing on the reconstruction result:

5.1. performing point cloud preprocessing to remove noise in the three-dimensional point cloud;

5.2. performing point cloud segmentation to further remove noise, where a target object point cloud is obtained by the segmentation at the same time;

step 6: modeling and analyzing the target object point cloud, marking a size to be measured and performing measurement:

for an object with a simple shape, establishing multiple geometric body models, using these geometric bodies to fit the target object, fitting a size to be measured with side lengths and radius parameters of the geometric bodies, and automatically marking the position of the size to be measured through a computer and obtaining its specific values at the same time; for example, for stationery, establishing geometric body models such as a cylinder and a cuboid, and then using the cylinder to fit an object such as a signature pen, and using the cuboid to fit an object such as a notebook, a pencil case, and an eraser, where when the geometric body and the target object point cloud basically coincide, it is considered that the fitting is completed, parameters including a length, a width, a height, a radius and the like of the geometric body can be read to know the size of the target object; and for an object with a more complex shape, performing up-sampling, surface fitting, and the like on a target object point cloud to ensure the integrity of the target object, then checking a three-dimensional model of the target object, and manually marking a size to be measured on the computer and obtaining its specific values at the same time.

Compared with prior art, the present disclosure has the following beneficial technical effects:

The present disclosure uses the convenience of data collection by the unmanned aerial vehicle platform, takes full advantage of the position information of the UAV platform and IMU data, and uses methods such as object detection, three-dimensional reconstruction, and three-dimensional point cloud processing, which is simpler in operation and has higher versatility. The method for vision measurement of a static rigid object based on an unmanned aerial vehicle platform of the present disclosure utilizes the convenience of data collection by the UAV platform and the GNSS, IMU, and the like of the UAV platform to assist measurement, and there is no need of common auxiliary devices such as a light pen and a marker.

BRIEF DESCRIPTION OF THE DRAWINGS

FIG. 1 is an algorithm flow chart of the present disclosure.

DETAILED DESCRIPTION OF THE EMBODIMENTS

The technical solutions in embodiments of the present disclosure will be clearly and completely described below with reference to the accompanying drawings in the embodiments of the present disclosure. Obviously, the embodiments described are merely a part of the embodiments of the present disclosure, not all the embodiments. Based on the embodiments of the present disclosure, all other embodiments obtained by a person of ordinary skill in the art without creative work shall fall within the protection scope of the present disclosure.

The present disclosure provides an unmanned aerial vehicle platform based vision measurement method for a static rigid object, including the following steps:

Step 1. Determine a target object, plan a flight path, and mount a camera on the unmanned aerial vehicle platform. An unmanned aerial vehicle (UAV) should have a global navigation satellite system (GNSS) and an inertial measurement unit (IMU). With just a monocular camera, a task can be accomplished, and a binocular camera can be used to improve the accuracy of a final result.

Step 2. Operate the UAV for aerial photography according to the planned flight path, after the UAV returns, read images, position information, and IMU data, and determine a corresponding relationship therebetween according to a timestamp.

Step 3: Perform object detection on each image and record the position of a target object in the image. An appropriate object detection method should be selected according to target characteristics and task requirements (for example, for a pedestrian target, a detection method based on HOG features should be used; and for a task with high real-time requirements, a YOLO convolutional neural network should be used for detection), the position of the target object in the image is indicated by a detection frame, instance segmentation is further performed on the image, and a mask obtained by the segmentation is used to represent the position of the target object.

Step 4: Convert the UAV position information and the IMU data corresponding to each image into camera extrinsics:

$$R = \begin{bmatrix} \cos\gamma & \sin\gamma & 0 \\ -\sin\gamma & \cos\gamma & 0 \\ 0 & 0 & 1 \end{bmatrix} \begin{bmatrix} 1 & 0 & 0 \\ 0 & \cos\beta & \sin\beta \\ 0 & -\sin\beta & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix}$$

$$t = P_1 - P_2$$

where $\alpha$, $\beta$, and $\gamma$ are rotation transformation Euler angles between a UAV body coordinate system (an IMU coordinate system) corresponding to a current image and a local horizontal coordinate system (a North-East-Down (NED) coordinate system), which are measured by the IMU; $P_1$ is initial position coordinates of the UAV in the NED coordinate system, which is provided by the GNSS; $P_2$ is UAV position coordinates corresponding to a current image in the NED coordinate system, which can be provided directly by the GNSS or can also be calculated from the IMU data in combination with $P_1$, and combining P obtained by two different channels can improve the accuracy of the result; t calculated by $P_1-P_2$ is a translation corresponding to the current image of the UAV; and with R used as a rotation matrix of the camera, and t used as a translation vector of the camera, the camera extrinsics can be obtained;

Step 5: Perform three-dimensional reconstruction by combining the result of the object detection and the calculated camera extrinsics:

5.1. Extract features of each image successively, and remove parts not belonging to the target object.

5.2. Screen the images to remove images with feature numbers less than a threshold $T_1$, and generate feature descriptors for the remaining images.

5.3. Perform feature matching between the images, and removing image pairs with matching numbers less than a threshold $T_2$;

5.4. Perform three-dimensional reconstruction with the remaining image pairs to obtain a three-dimensional point cloud, where in the reconstruction process, the camera extrinsics calculated in the step 4 are used.

Step 6: Perform three-dimensional point cloud processing on the reconstruction result:

6.1. Perform point cloud preprocessing to remove noise in the three-dimensional point cloud.

6.2. Perform point cloud segmentation to further remove noise, where a target object point cloud is obtained by the segmentation at the same time.

Step 7: Model and analyze the target object point cloud, mark a size to be measured and perform measurement:

For an object with a simple shape, establish multiple geometric body models, use these geometric bodies to fit the target object, fitting a size to be measured with side lengths and radius parameters of the geometric bodies, and automatically mark the position of the size to be measured through a computer and obtain its specific values at the same time. For example, for stationery, establish geometric body models such as a cylinder and a cuboid, and then using the cylinder to fit an object such as a signature pen, and using the cuboid to fit an object such as a notebook, a pencil case, and an eraser. When the geometric body and the target object point cloud basically coincide, it is considered that the fitting is completed, parameters including a length, a width, a height, a radius and the like of the geometric body can be read to know the size of the target object.

For an object with a more complex shape, perform up-sampling, surface fitting, and the like on a target object point cloud to ensure the integrity of the object, then check a three-dimensional model of the object, and manually mark a size to be measured on the computer and obtain its specific values at the same time.

Although the illustrative specific implementations of the present disclosure have been described above to facilitate those skilled in the art to understand the present disclosure. It should be clear that the present disclosure is not limited to the scope of the specific implementations. For a person of ordinary skill in the art, as long as various changes are within the spirit and scope of the present disclosure defined and determined by the appended claims, these changes are obvious, and all inventions and creations that use the concept of the present disclosure fall within the scope of protection.

What is claimed is:

1. An unmanned aerial vehicle platform based vision measurement method for a static rigid object, comprising the following steps:

step 1: determining a target object, planning a flight path, and mounting a camera on the unmanned aerial vehicle platform, wherein an unmanned aerial vehicle (UAV) has a global navigation satellite system (GNSS) and an inertial measurement unit (IMU);

step 2: operating the UAV for aerial photography according to the planned flight path, after the UAV returns, reading images, position information, and IMU data, and determining a corresponding relationship therebetween according to a timestamp;

step 3: performing object detection on each image successively, and recording the position of the target object in the image, wherein an appropriate object detection method should be selected according to target characteristics and task requirements, the position of the target object in the image is indicated by a detection frame, instance segmentation is further performed on the image, and a mask obtained by the segmentation is used to represent the position of the target object;

step 4: converting the UAV position information and the IMU data corresponding to each image into camera extrinsics:

$$R = \begin{bmatrix} \cos\gamma & \sin\gamma & 0 \\ -\sin\gamma & \cos\gamma & 0 \\ 0 & 0 & 1 \end{bmatrix} \begin{bmatrix} 1 & 0 & 0 \\ 0 & \cos\beta & \sin\beta \\ 0 & -\sin\beta & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix}$$

$$t = P_1 - P_2$$

where $\alpha$, $\beta$, and $\gamma$ are rotation transformation Euler angles between a UAV body coordinate system that is an IMU coordinate system corresponding to a current image and a local horizontal coordinate system that is a North-East-Down (NED) coordinate system, which are measured by the IMU; $P_1$ is initial position coordinates of the UAV in the NED coordinate system, which is provided by the GNSS; $P_2$ is UAV position coordinates corresponding to a current image in the NED coordinate system, which can be provided directly by the GNSS or can also be calculated from the IMU data in combination with $P_1$, and combining $P_2$ obtained by two different channels can improve the accuracy of the result; t calculated by $P_1 - P_2$ is a translation corresponding to the current image of the UAV; and with R used as a rotation matrix of the camera, and t used as a translation vector of the camera, the camera extrinsics can be obtained;

step 5: performing three-dimensional reconstruction by combining the result of the object detection and the calculated camera extrinsics;

(1) extracting features of each image successively, and removing parts not belonging to the target object;

(2) screening the images to remove images with feature numbers less than a threshold $T_1$, and generating feature descriptors for the remaining images;

(3) performing feature matching between the images, and removing image pairs with matching numbers less than a threshold $T_2$;

(4) performing three-dimensional reconstruction with the remaining image pairs to obtain a three-dimensional point cloud, wherein in the reconstruction process, the camera extrinsics calculated in the step 4 are used;

step 6: performing three-dimensional point cloud processing on the reconstruction result;

(1) performing point cloud preprocessing to remove noise in the three-dimensional point cloud;

(2) performing point cloud segmentation to further remove noise, wherein a target object point cloud is obtained by the segmentation at the same time;

step 7: modeling and analyzing the target object point cloud, marking a size to be measured and performing measurement;

for an object with a simple shape, establishing multiple geometric body models, using these geometric bodies to fit the target object, fitting a size to be measured with side lengths and radius parameters of the geometric bodies, and automatically marking the position of the size to be measured through a computer, obtaining its specific values at the same time; and for an object with a more complex shape, performing up-sampling and surface fitting on a target object point cloud to ensure the integrity of the target object, then checking a three-dimensional model of the target object, and manually marking a size to be measured on the computer and obtaining its specific values at the same time.

2. The unmanned aerial vehicle platform based vision measurement method for a static rigid object according to claim 1, wherein in the step 1, a monocular camera or a binocular camera is used to improve the accuracy of a final result.

3. The unmanned aerial vehicle platform based vision measurement method for a static rigid object according to claim 1, wherein the selection of an appropriate object detection method in the step 2 comprises that for a pedestrian target, a detection method based on Histogram of Oriented Gradients (HOG) features should be used; and for a task with high real-time requirements, a You Only Lock Once (YOLO) convolutional neural network should be used for detection.

\* \* \* \* \*